United States Patent [19]
Li et al.

[11] Patent Number: 5,781,671
[45] Date of Patent: *Jul. 14, 1998

[54] FREE-SPACE ANGLE-MULTIPLEXED OPTICAL INTERCONNECT NETWORK

[75] Inventors: Yao Li, Monmouth Junction; Richard A. Linke; Ting Wang, both of Princeton, all of N.J.

[73] Assignee: NEC Research Institute, Inc., Princeton, N.J.

[*] Notice: This patent issued on a continued prosecution application filed under 37 CFR 1.53(d), and is subject to the twenty year patent term provisions of 35 U.S.C. 154(a)(2).

[21] Appl. No.: 539,154

[22] Filed: Oct. 4, 1995

[51] Int. Cl.$^6$ ............................................. G11C 11/42
[52] U.S. Cl. ................... 385/17; 359/117; 359/115; 359/139; 372/50
[58] Field of Search ................ 385/17; 250/208.2, 250/208.4; 359/117, 115, 139, 561, 569, 35; 372/50; 365/127

[56] References Cited

U.S. PATENT DOCUMENTS

| | | | |
|---|---|---|---|
| 3,573,433 | 4/1971 | Harris | 365/127 |
| 4,410,804 | 10/1983 | Stauffer | 250/208.2 |
| 4,663,738 | 5/1987 | Sprague et al. | 365/127 |
| 5,138,489 | 8/1992 | Paek | 359/561 |
| 5,325,386 | 6/1994 | Jewell et al. | 372/50 |
| 5,339,177 | 8/1994 | Jenkins et al. | 359/35 |
| 5,412,506 | 5/1995 | Feldblum et al. | 359/569 |
| 5,434,434 | 7/1995 | Kasahara et al. | 359/566 |

*Primary Examiner*—Rodney B. Bovernick
*Assistant Examiner*—Yisun Song
*Attorney, Agent, or Firm*—Arthur J. Torsiglieri; Philip J. Feig; Jeffery J. Brosemer

[57] ABSTRACT

A point-to-point optical network for interconnecting processing elements uses a two-dimensional array of chips, each of which includes a two-dimensional array of lasers that are used to target a two-dimensional array of photodetectors. A two-dimensional array of lenslets together with a spherical lens are used to focus light from a laser in the j, k position in any one of the laser arrays in any one of the chips on the particular photodetector in the j,k position in the photodetector array.

5 Claims, 2 Drawing Sheets

FREE-SPACE ANGLE-MULTIPLEXED OPTICAL INTERCONNECT NETWORK

FIELD OF THE INVENTION

This invention relates to apparatus for interconnecting components of a system and more particularly to the use of free-space optics in making such interconnections.

BACKGROUND OF THE INVENTION

There is considerable interest in the use of optics for interconnections in electronic systems. Of particular interest is the use of optics for interconnecting processing elements in large scale computers that utilize a large number of processing elements doing parallel computations.

Of particular interest have been interconnection systems that combine electronic switching with optical switching.

An element important to many such systems is a point-to-point passive beam steering arrangement in which individual processing elements in a transmitting group communicate optically with selected individual processing elements in a relatively distant receiving group. To this end, there is associated with each processing element in the first transmitting group a separate two-dimensional array of lasers and with each processing element in the receiving group a specific photodetector in a two-dimensional array of photodetectors.

A point-to-point optical steering arrangement is used so that a laser positioned in a j, k position in any of the laser arrays targets the photodetector positioned in the same j, k position in the photodetector array.

SUMMARY OF THE INVENTION

The present invention provides a novel point-to-point optical transmission arrangement for use as an optical interconnect network. In its preferred embodiment, it includes a separate two-dimensional array of point light sources for each transmitting processing element. Advantageously, the array of point light sources is provided by a chip that includes a two-dimensional array of vertical-cavity surface-emitting lasers (VCSEL), each laser serving as a separate point light source. The chips in turn are also arranged in a two-dimensional array. A lenslet is associated with each VCSEL chip and the lenslets in turn form a two-dimensional array matching the two-dimensional array of chips. Each lenslet is positioned its focal length from its associated VCSEL chip, and collects the cone of light emitted by the chip and forms it into a collimated beam whose direction will be related to the position where the emitted cone of light traverses the lenslet. The various beams emitted by the chips of the two-dimensional array of chips are collected by a macrolens positioned in their path and the macrolens combine the beams into a single two-dimensional pattern that matches the pattern of the two dimensional array of lasers in each chip. This pattern is imaged on a two-dimensional array of photodetectors of which each one is associated with a different receiving processing element, such that a laser positioned in a j, k position in any one of the laser chips will target the photodetector in the same j, k position in the photodetector array. Accordingly, any processing element in the transmitting group can target a processing element in the receiving group whose photodetector is in the j, k position of the photodetector array by exciting the laser in the j, k position in the laser array with which it is associated.

It should be evident that if fewer interconnections need to made, the network may be used with a one-dimensional array of light sources in which case there is needed only a one-dimensional array of lenslet and a one dimensional array of photodetectors and a cylindrical lens may be used in place of a spherical lens.

The invention will be better understood from the following more detailed description taken in conjunction with the accompanying drawing.

DETAILED DESCRIPTION OF THE INVENTION

Figure 1:
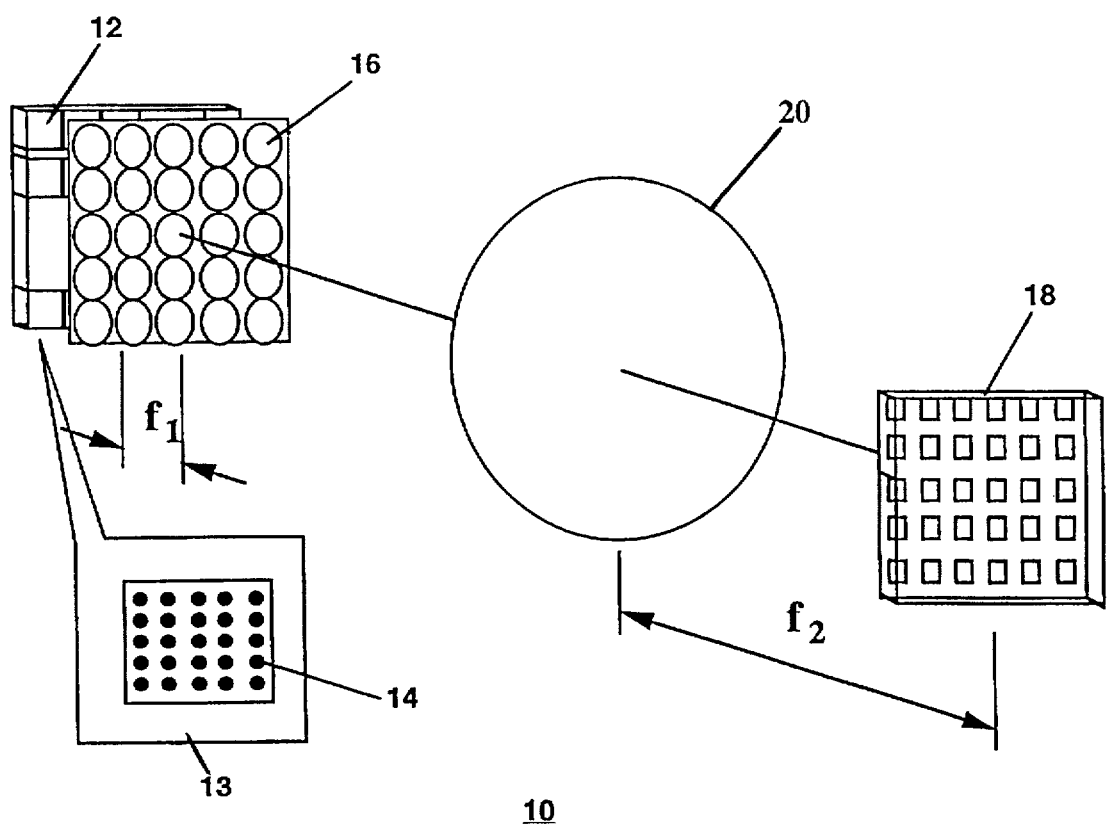
FIG. 1 shows a schematic three-dimensional view of an optical interconnect network in accordance with the invention.
Figure 2:
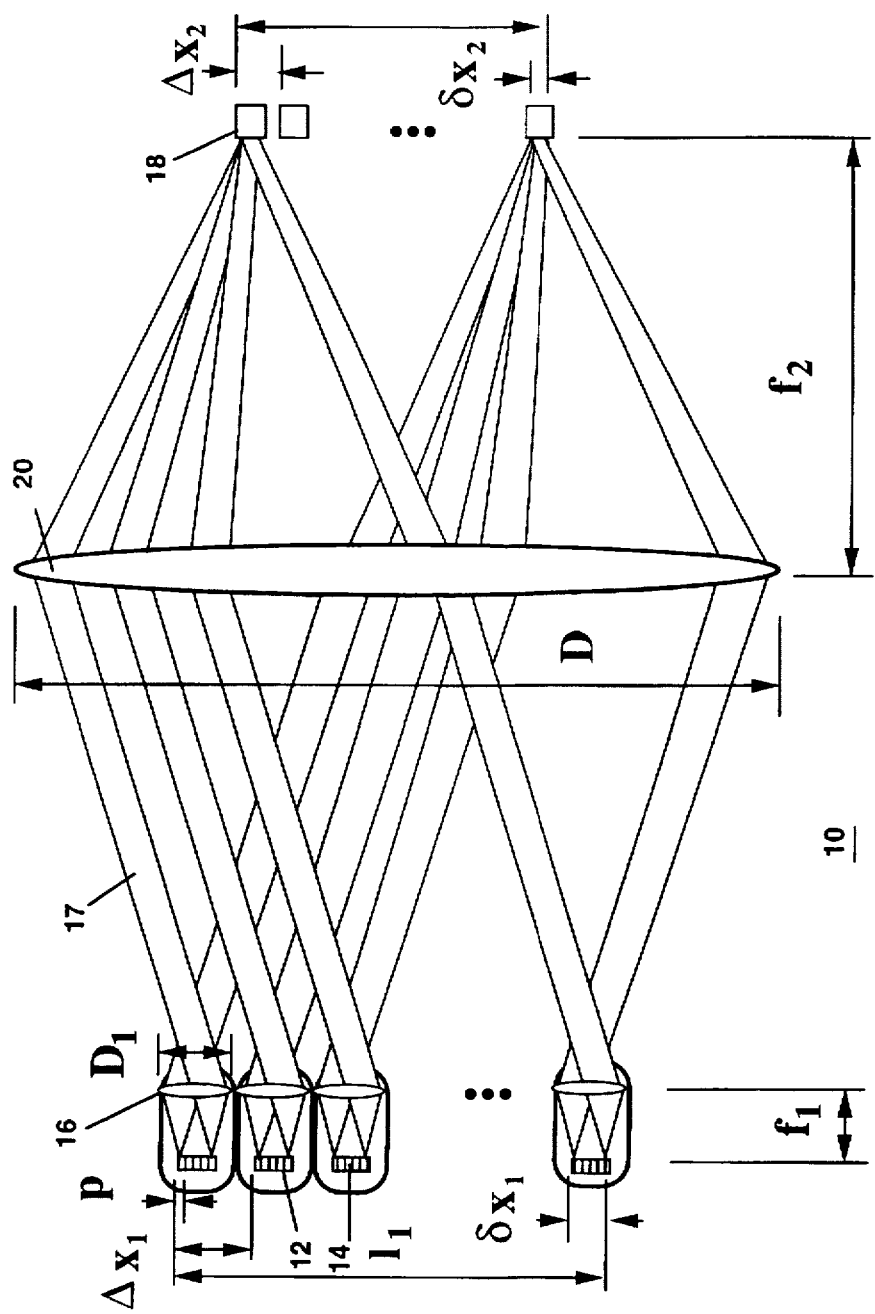
FIG. 2 Shows a view that corresponds to either a top or side view of the optical network shown in FIG. 1.

With reference now to the drawing, the interconnect network 10 shown in FIGS. 1 and 2 includes a coplanar array of VCSEL chips 12 arranged in an M×M two dimensional array. Each VCSEL chip is associated with a different one of $M^2$ transmitting processing elements (not shown) Each VCSEL chip in turn, as seen in the exploded view 13, comprises an n×n coplanar array of vertical-cavity surface-emitting lasers 14, each emitting a conical beam of light. Opposite the array of chips 12 is a matching M×M coplanar array of spherical lenslets 16, one lenslet for each chip. M can be equal to or different from n. The lenslet associated with a chip is positioned to intercept substantially all of the light emitted by any laser in the chip, and to remain sensitive to the angle of the light intercepted. The plane of the array of chips and the plane of the array of lenslets are separated by the distance $f1$, the focal length of the lenslet. The signal of a transmitting processing element that is to be transmitted is supplied to its associated chip and is directed within the chip to the laser that is positioned in a particular j, k position in the laser array.

At the receiving end of the interconnection network, there is positioned an n×n planar array of photodetectors 18, a separate detector being associated with a different one of the $n^2$ plurality of receiving processing elements. As discussed previously, the selective switching strategy is that in order to send data to a receiving photodetector located at the kth row and lth column of the detector array, a laser located at the kth row and lth column of one of the VCSEL chips in the array 12 at the transmitting end is activated. To this end, a large spherical lens 20 (macrolens) is located intermediate between the array of chips 12 and the photodetector array 18 such that it is separated from the plane of the photodetectors 18 by its focal length $f2$. The macrolens 20 intercepts the conical beam of an individual activated laser in the j, k position that has been collimated by a lenslet 16 into cylindrical beam 17 and focuses it for incidence on the targeted photodetector in the j, k position in accordance with the strategy described above. The combined action of the lenslet and the macrolens in the light path achieve the desired strategy.

While light beams have been shown for two lasers of each chip in the drawing, in practice typically only one laser in a chip is activated at a given instant in time, unless the transmitting processing element associated with the chip is seeking to transmit to more than one other processing element in the distant group of receiving processing elements.

It can be appreciated that other forms of point light sources can be used in place of the VCSEL chips. Similarly, it would be advantageous if all of the point light sources could be integrated in a single chip to form the desired arrays of light sources. Additionally,it should be evident that a desired plurality of point light sources can be obtained by using one relatively large light source that provides a collimated beam that irradiates a mask that includes an appropriate array of apertures or openings, each of which can be selectively opened or closed by a control arrangement to permit the passage therethrough of one or more light beams formed from the relatively large source. In this arrangement, the individual light beams are targeted, in the manner earlier described, to permit interconnection with a particular processing element by choice of the photodetectors targeted.

It can also be appreciated that the targeting function of the lenslets and the spherical lens can be realized with a hologram comprising a series of concentric gratings rather than with the conventional optics using discrete elements.

Additionally, the term processing element is intended to include any of the variety of electronic components that might need interconnection including memories, processors, and input/output devices.

What is claimed is:

1. A point-to-point optical interconnection network for coupling a predetermined transmitting element contained within an array of arrays of transmitting elements with a predetermined receiving element contained within an array of receiving elements, said interconnection network comprising:

a two-dimensional coplanar chip array (12) of coplanar two-dimensional arrays (13) of vertical cavity surface emitting lasers (14);

a coplanar two-dimensional array of photodetectors (18); said photodetectors (18) being positionally associated with said lasers such that a laser at the j, k position in any of said arrays (13) corresponds with a photodetector at the j, k position in said array of photodetectors (18); and a holographic imager, disposed between said coplanar two-dimensional chip array and said two-dimensional coplanar array of photodetectors such that light emitted from the laser at the j, k position in any of said two-dimensional arrays (13) of vertical cavity surface emitting lasers (14) is received only at the photodetector in the j, k positions of said array of photodetectors.

2. A point-to-point optical interconnection network as set forth in claim 1, further comprising transmitting processing elements, each transmitting processing element being associated with a different chip in said chip array for causing a laser at a predetermined position or positions in a predetermined array of lasers to transmit light through said holographic imager to a corresponding one or ones of said photodetectors in said array of photodetectors either individually or in parallel.

3. A point-to-point optical interconnection network for coupling a predetermined transmitting element contained within an array of arrays of transmitting elements with a predetermined receiving element contained within an array of receiving elements, said interconnection network comprising:

a two-dimensional coplanar chip array (12) of coplanar two-dimensional arrays (13) of vertical cavity surface emitting lasers (14);

a coplanar two-dimensional array of photodetectors (18);

said photodetectors (18) being positionally associated with said lasers such that a laser at the j, k position in any of said two-dimensional arrays (13) corresponds with a photodetector at the j, k position in said array of photodetectors (18); and an imager, disposed between said two-dimensional coplanar chip array and said two-dimensional array of photodetectors, said imager including a two-dimensional array of lenslets disposed between said chip array and said array of photodetectors and a macrolens disposed between said two-dimensional array of lenslets and said array of photodetectors such that light emitted from the vertical cavity surface emitting laser in the j, k position in any of said two-dimensional arrays (13) of vertical cavity surface emitting lasers (14) is first collimated by the lenslet in the array of lenslets corresponding to said any of said two-dimensional arrays (13) and then focused into a two-dimensional beam of light by said macrolens such the light emitted is received only at the photodetector in the j, k position of said array of photodetectors.

4. A point-to-point optical interconnect network as set forth in claim 3, where said macrolens is a spherical lens.

5. A point-to-point optical interconnection network as set forth in claim 3, further comprising transmitting processing elements, each transmitting processing element being associated with a different chip in said chip array for causing a laser at a predetermined position or positions in a predetermined array of lasers to transmit light through said imager to a corresponding one or ones of said photodetectors in said array of photodetectors either individually or in parallel.

* * * * *